US010123290B2

(12) United States Patent
Seo et al.

(10) Patent No.: US 10,123,290 B2
(45) Date of Patent: Nov. 6, 2018

(54) METHOD FOR SCANNING RESOURCE FOR DEVICE-TO-DEVICE DIRECT COMMUNICATION IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/913,304

(22) PCT Filed: Nov. 27, 2014

(86) PCT No.: PCT/KR2014/011486
§ 371 (c)(1),
(2) Date: Feb. 19, 2016

(87) PCT Pub. No.: WO2015/080488
PCT Pub. Date: Jun. 4, 2015

(65) Prior Publication Data
US 2016/0205647 A1 Jul. 14, 2016

Related U.S. Application Data

(60) Provisional application No. 61/910,027, filed on Nov. 27, 2013, provisional application No. 61/923,243, (Continued)

(51) Int. Cl.
H04W 56/00 (2009.01)
H04W 72/04 (2009.01)
(Continued)

(52) U.S. Cl.
CPC ....... *H04W 56/0015* (2013.01); *H04L 1/1812* (2013.01); *H04L 5/0044* (2013.01);
(Continued)

(58) Field of Classification Search
CPC .... H04L 5/0044; H04L 5/0092; H04W 4/005; H04W 72/02; H04W 72/0453;
(Continued)

(56) References Cited

U.S. PATENT DOCUMENTS 9,055,389 B2 * 6/2015 Miklos ................. H04W 8/005
9,591,671 B2 * 3/2017 Yamazaki ........... H04W 76/023
(Continued)

FOREIGN PATENT DOCUMENTS

CN          102893657        1/2013
KR       1020120100833       9/2012
(Continued)

OTHER PUBLICATIONS

PCT International Application No. PCT/KR2014/011486, Written Opinion of the International Searching Authority dated Mar. 5, 2015, 18 pages.
(Continued)

Primary Examiner — Ahmed Elallam
(74) Attorney, Agent, or Firm — Lee, Hong, Degerman, Kang & Waimey PC

(57) ABSTRACT

In the present application, a method for transmitting a signal using device-to-device direct communication by a transmission user equipment in a wireless communication system is disclosed. Specifically, the method comprises the steps of: calculating, within a first resource pool which is periodically defined, a predetermined metric with one or more resource units for a plurality of resource units included in the first resource pool; determining a transmission resource on the basis of the calculated metric; and transmitting a device-to-
(Continued)

device communication signal to a reception user equipment using the transmission resource in a second resource pool subsequent to the first resource pool.

10 Claims, 16 Drawing Sheets

Related U.S. Application Data filed on Jan. 3, 2014, provisional application No. 61/993,284, filed on May 15, 2014.

(51) Int. Cl.
| | |
|---|---|
| *H04W 72/12* | (2009.01) |
| *H04L 1/18* | (2006.01) |
| *H04L 5/00* | (2006.01) |
| *H04W 72/02* | (2009.01) |
| *H04W 4/70* | (2018.01) |
| *H04W 88/02* | (2009.01) |
| *H04W 88/08* | (2009.01) |
| *H04W 88/16* | (2009.01) |

(52) U.S. Cl.
CPC ............ *H04L 5/0092* (2013.01); *H04W 4/70* (2018.02); *H04W 72/02* (2013.01); *H04W 72/0453* (2013.01); *H04W 72/1215* (2013.01); *H04W 72/1284* (2013.01); *H04W 72/1289* (2013.01); *H04W 88/02* (2013.01); *H04W 88/08* (2013.01); *H04W 88/16* (2013.01)

(58) Field of Classification Search
CPC ......... H04W 72/0446; H04W 72/1242; H04W 72/1284; H04W 88/02; H04W 88/08; H04W 88/16
See application file for complete search history.

(56) References Cited

U.S. PATENT DOCUMENTS

| | | | |
|---|---|---|---|
| 2007/0121531 | A1 | 5/2007 | Lee et al. |
| 2011/0282989 | A1* | 11/2011 | Geirhofer ............ H04L 67/104 |
| | | | 709/224 |
| 2012/0044815 | A1* | 2/2012 | Geirhofer ........... H04W 72/082 |
| | | | 370/248 |
| 2012/0129562 | A1 | 5/2012 | Stamoulis et al. |
| 2012/0201158 | A1* | 8/2012 | Geirhofer ........... H04W 52/383 |
| | | | 370/252 |
| 2012/0300662 | A1 | 11/2012 | Wang et al. |
| 2013/0109301 | A1 | 5/2013 | Hakola et al. |
| 2013/0170476 | A1 | 7/2013 | Baker et al. |
| 2013/0294296 | A1 | 11/2013 | Dimou et al. |
| 2013/0322413 | A1* | 12/2013 | Pelletier ............ H04W 72/1289 |
| | | | 370/336 |
| 2014/0328329 | A1* | 11/2014 | Novlan ................ H04W 72/042 |
| | | | 370/336 |
| 2016/0135200 | A1* | 5/2016 | Brahmi .................... H04W 4/06 |
| | | | 370/329 |
| 2016/0219541 | A1* | 7/2016 | Chatterjee ......... H04W 36/0055 |
| 2016/0219640 | A1* | 7/2016 | Jung ...................... H04W 72/02 |
| 2016/0242152 | A1* | 8/2016 | Yu .......................... H04W 8/005 |
| 2016/0255615 | A1* | 9/2016 | Chatterjee ......... H04W 36/0055 |
| | | | 370/330 |
| 2016/0302251 | A1* | 10/2016 | Chatterjee ............. H04W 8/005 |

FOREIGN PATENT DOCUMENTS

| | | |
|---|---|---|
| KR | 1020130028106 | 3/2013 |
| WO | 2011143496 | 11/2011 |

OTHER PUBLICATIONS

European Patent Office Application Serial No. 14865577.2, Search Report dated Jun. 12, 2017, 8 pages.
State Intellectual Property Office of the People's Republic of China Application Serial No. 201480054268.1, Office Action dated Jun. 5, 2018, 12 pages.

* cited by examiner

FIG. 2
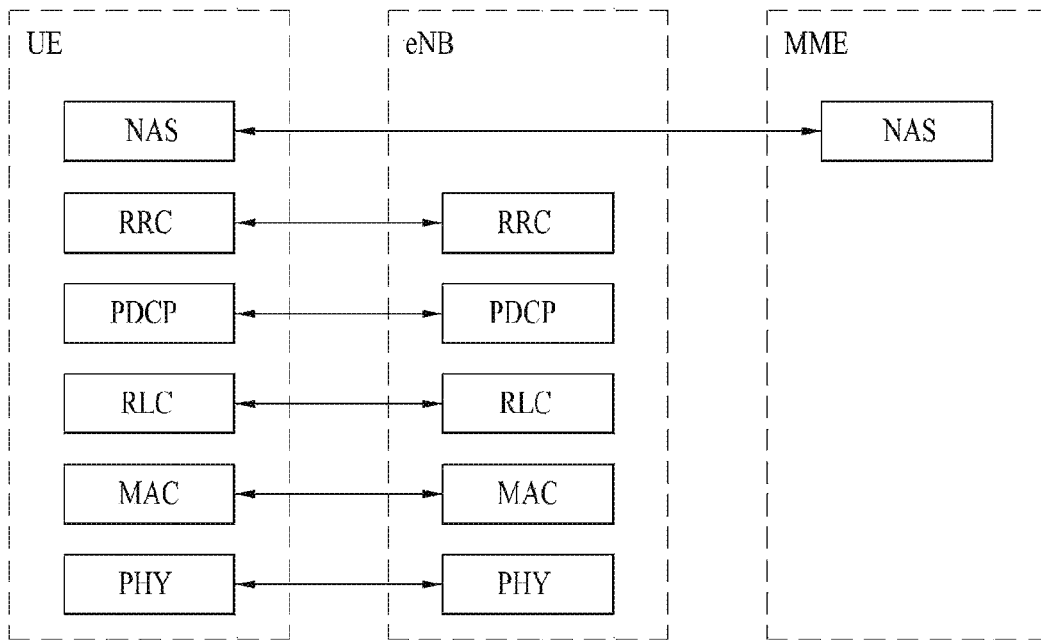
(A) CONTROL-PLANE PROTOCOL STACK
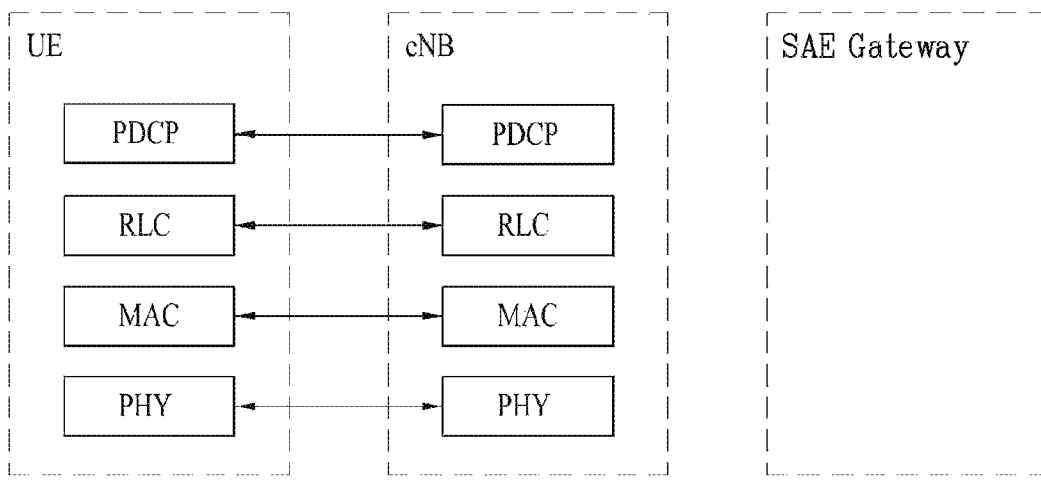
(B) USER-PLANE PROTOCOL STACK D2D signal transmission
from UE to which resource unit #0
is allocated

METHOD FOR SCANNING RESOURCE FOR DEVICE-TO-DEVICE DIRECT COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/011486, filed on Nov. 27, 2014, which claims the benefit of U.S. Provisional Application No. 61/910,027, filed on Nov. 27, 2013, 61/923,243, filed on Jan. 3, 2014 and 61/993,284, filed on May 15, 2014, the contents of which are all hereby incorporated by reference herein in their entirety.

TECHNICAL FIELD

The present invention relates to a wireless communication system and, more particularly, to a resource scan method for device-to-device (D2D) communication in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the above discussion, a resource scan method for D2D communication in a wireless communication system and an apparatus therefor will be proposed hereinafter.

Technical Solution

In an aspect of the present invention, provided herein is a method for transmitting a signal using device-to-device (D2D) communication by a transmission user equipment (UE) in a wireless communication system, including calculating a predetermined metric, in a periodically defined first resource pool, in units of one or more resource units with respect to a plurality of resource units included in the first resource pool; determining a transmission resource based on the calculated metric; and transmitting a D2D communication signal to a reception UE in a second resource pool subsequent to the first resource pool, using the transmission resource.

The determining the transmission resource may include determining the transmission resource during a preset processing time based on the calculated metric.

The calculating the predetermined metric may include calculating the predetermined metric in units of a bundle of two or more resource units with respect to the plurality of resource units included in the first resource pool and the predetermined metric may be a minimum value or a mean value of metrics of the two or more resource units. The two or more resource units may be consecutive on a time or frequency axis.

The calculating the predetermined metric may include calculating a predetermined metric in units of one or more resource units with respect to a plurality of resource units included in a third resource pool, the third resource pool being located after the first resource pool and before the second resource pool, and selecting a smaller value of a metric for a specific resource unit of the first resource pool and a metric for the specific resource unit of the third resource pool as a final metric for the specific resource unit.

In another aspect of the present invention, provided herein is a user equipment (UE) for performing device-to-device (D2D) communication in a wireless communication system, including a wireless communication module for transmitting and receiving a signal to and from a base station or a peer UE of D2D communication; and a processor for processing the signal, wherein the processor calculates a predetermined metric, in a periodically defined first resource pool, in units of one or more resource units with respect to a plurality of resource units included in the first resource pool and determines a transmission resource based on the calculated metric, and the processor controls the wireless communication module to transmit a D2D communication signal to the peer UE in a second resource pool subsequent to the first resource pool, using the transmission resource.

The processor may determine the transmission resource during a preset processing time based on the calculated metric.

The processor may calculate the predetermined metric in units of a bundle of two or more resource units with respect to the plurality of resource units included in the first resource pool and wherein the predetermined metric is a minimum value or a mean value of metrics of the two or more resource units.

The processor may calculate a predetermined metric in units of one or more resource units with respect to a plurality of resource units included in a third resource pool, the third resource pool being located after the first resource pool and before the second resource pool, and select a smaller value of a metric for a specific resource unit of the first resource pool and a metric for the specific resource unit of the third resource pool as a final metric for the specific resource unit.

Advantageous Effects

According to an embodiment of the present invention, resources can be efficiently scanned for D2D communication and signals can be efficiently transmitted and received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE

Figure 1:
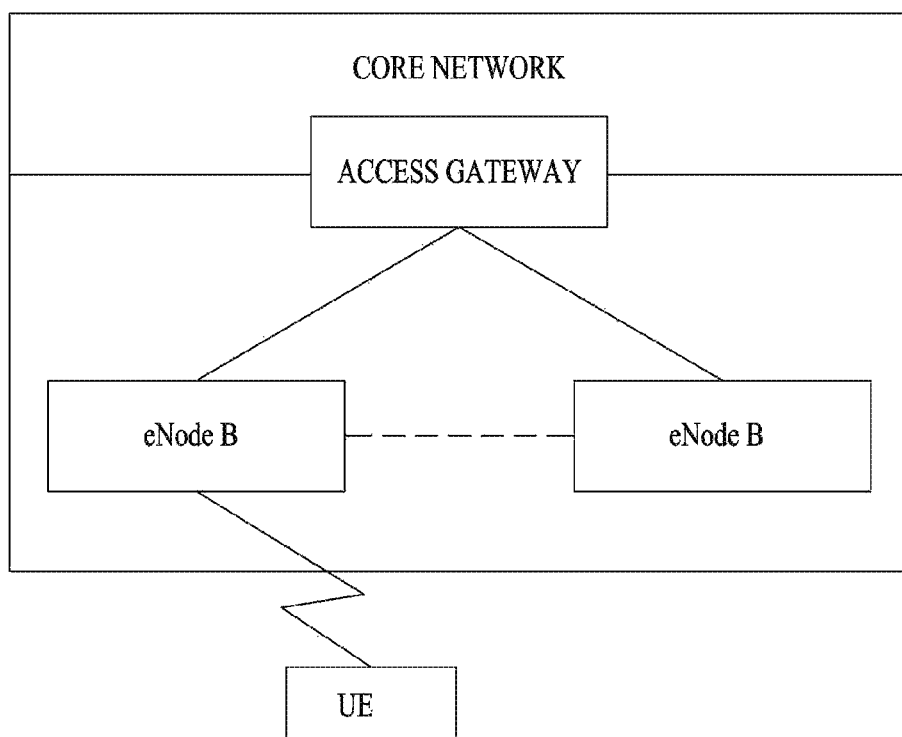
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
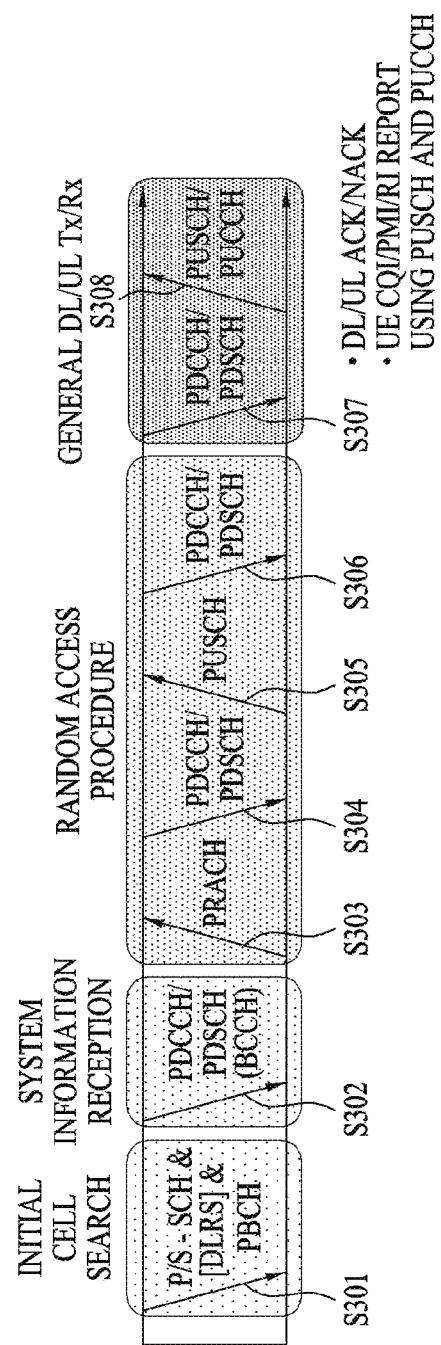
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
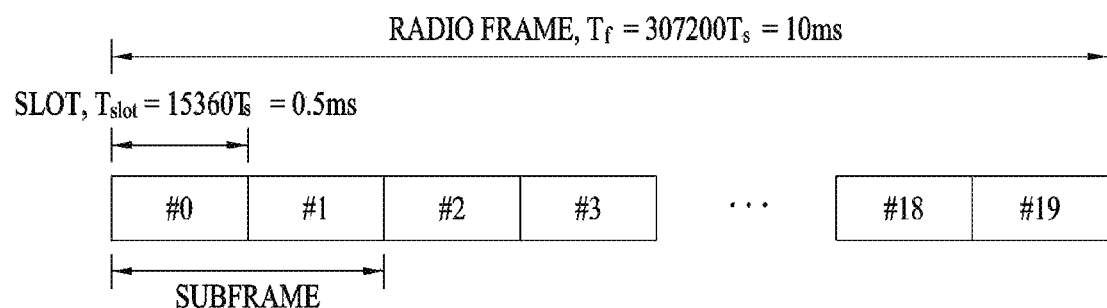
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ \text{kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
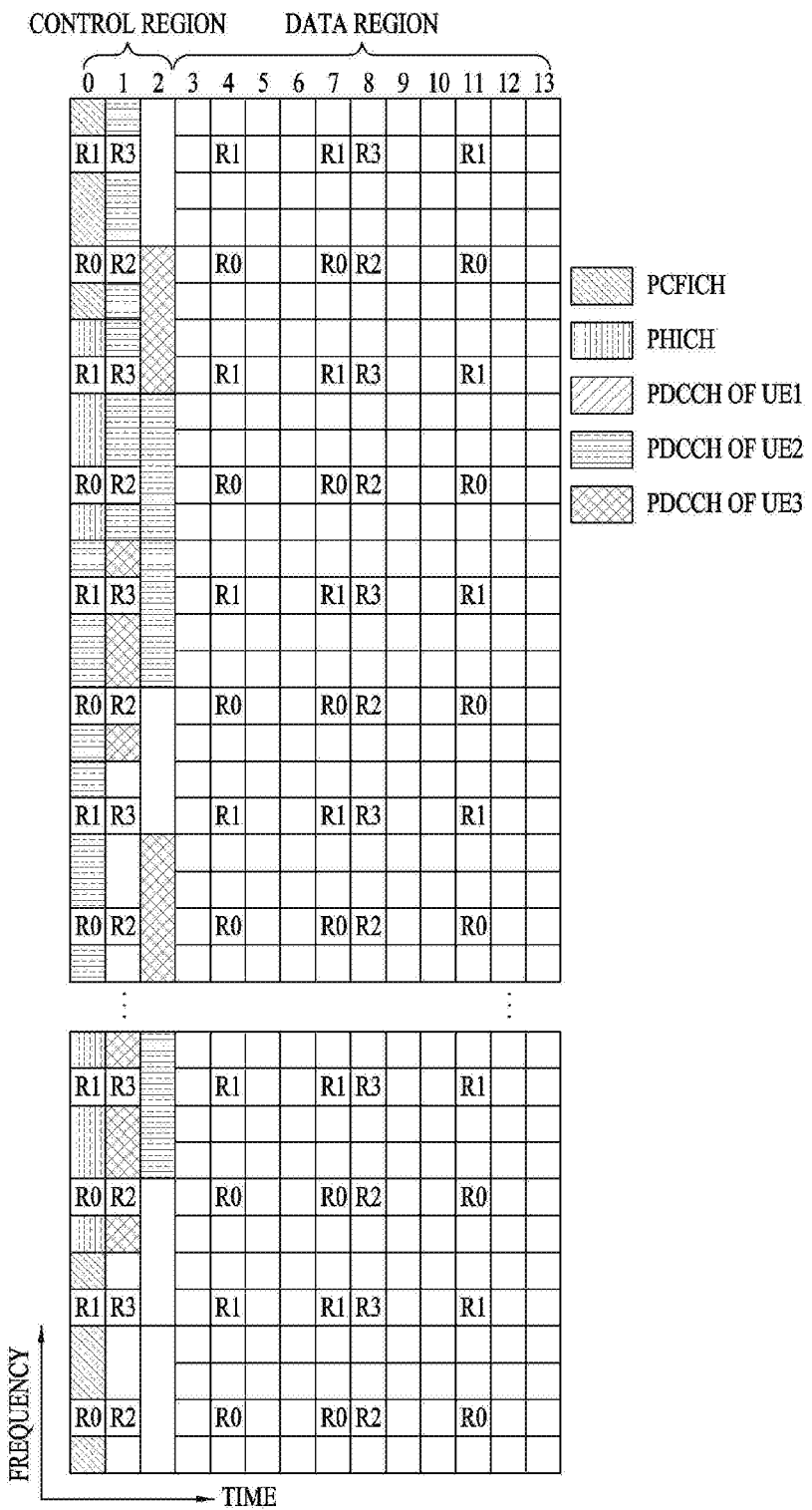
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
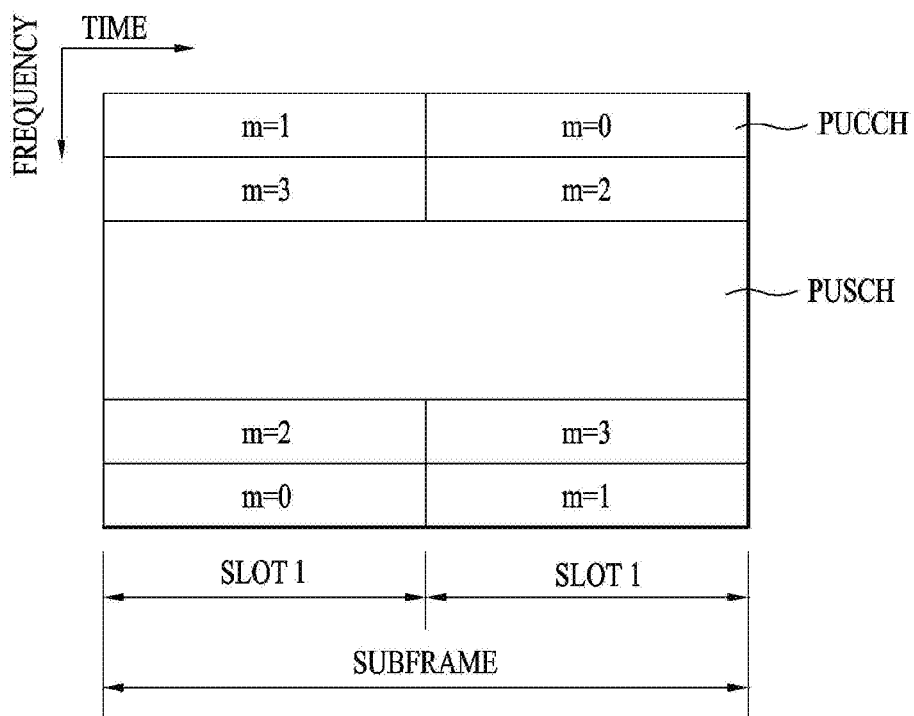
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
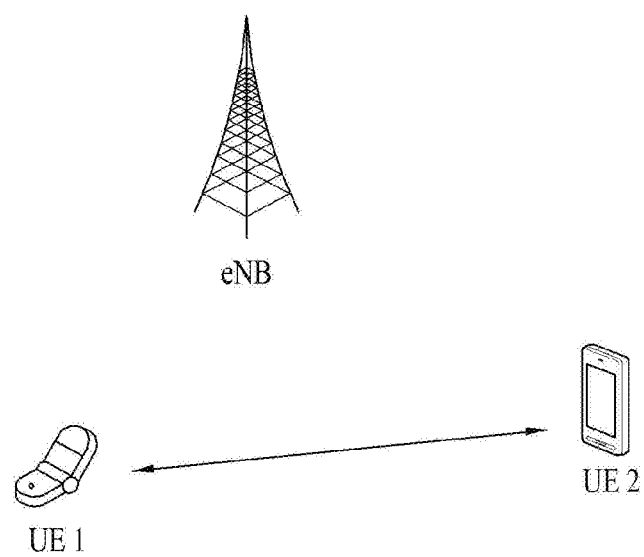
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In order to perform D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

Meanwhile, the case in which UE1 selects a resource unit corresponding to specific resources in a resource pool indicating a set of resources and transmits a D2D signal using the corresponding resource unit will be described hereinbelow. Herein, the resource pool may be indicated to UE1 by an eNB when UE1 is positioned within coverage of an eNB and the resource pool may be indicated to UE1 by another UE or predetermined when UE1 is positioned out of coverage of the eNB. Generally, the resource pool consists of a plurality of resource units and each UE may select one or plural resource units to use the resource units to transmit a D2D signal thereof.

Figure 8:
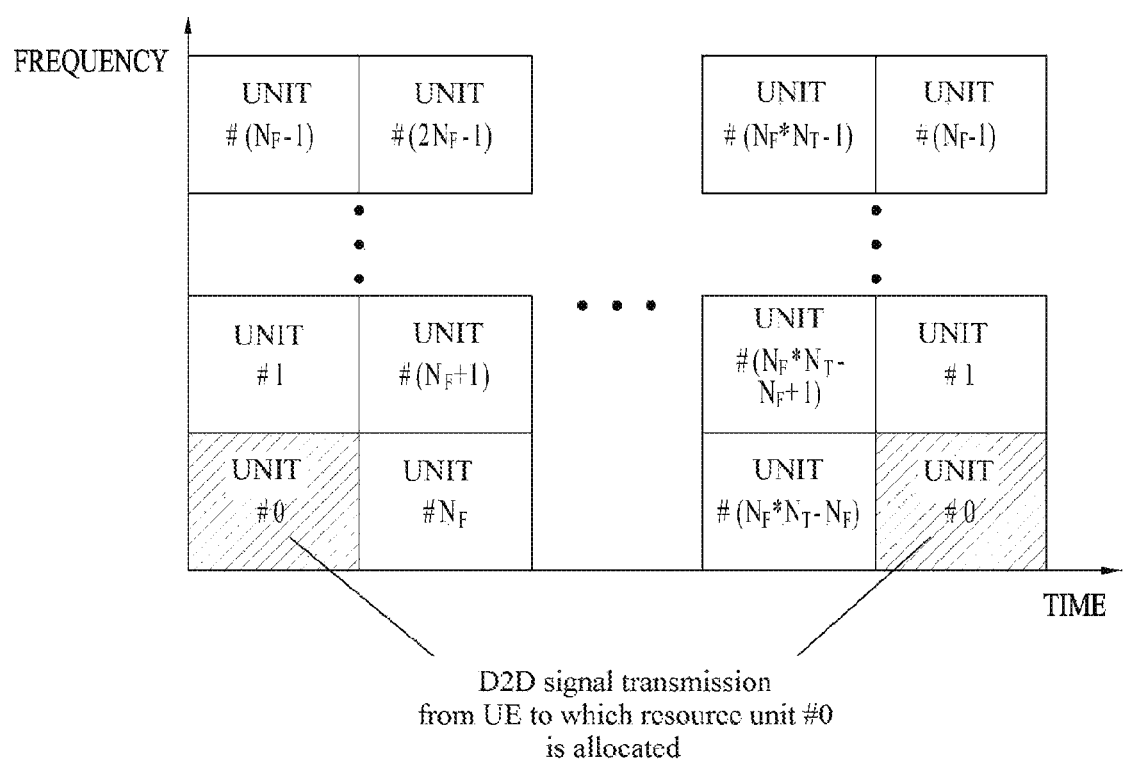
FIG. 8 illustrates an exemplary configuration of a resource pool and a resource unit.

FIG. 8 illustrates an exemplary configuration of a resource pool and a resource unit.

Referring to FIG. 8, all frequency resources are divided into $N_F$ frequency resources and all time resources are divided into $N_T$ time resources, thereby defining a total of ($N_F*N_T$) resource units. Particularly, a resource pool is repeated at a period of $N_T$ subframes. Characteristically, one resource unit may repeatedly appear in a periodic form. Alternatively, in order to gain a diversity effect in the time or frequency domain, an index of a physical resource unit to which one logical resource unit is mapped may be changed over time according to a predetermined pattern. In this resource unit structure, the resource pool may mean a set of resource units that can be used for transmission by a UE that desires to transmit a D2D signal.

In the aforementioned structure, before a specific UE transmits a D2D signal, it is necessary to scan resource units to discern which resource units existing UEs are using. The scan procedure serves to select a resource unit that is unused by the existing UEs or minimally affects the existing UEs. Hereinbelow, a resource pool scan scheme for effectively selecting a resource unit will be proposed.

First, a D2D transmission UE may calculate a metric as to whether each resource unit is used, in a resource pool scan procedure. Hereinafter, for convenience of description, it is assumed that the greater metric is, the more desirably a corresponding resource unit is used. The metric may be derived from an energy level measured in each resource unit. That is, if strong energy is detected in a specific resource unit, this means that a probability that a neighboring UE uses the resource unit is very high and thus a corresponding metric may be set to be low. For example, a metric of a resource unit, a reception energy level of which is E mW, may be given as 1/E. Alternatively, the metric may be derived from the reception power of a specific signal detected in each resource unit.

If all transmission UEs are set to transmit a specific signal in resource units used thereby, the reception power of the specific signal may directly indicate whether a neighboring UE uses the resource units. Desirably, the specific signal may be a demodulation reference signal (DM-RS) which is always transmitted together with a D2D signal.

It is apparent that various elements in addition to the above-described element may be used to determine the metric. Upon selecting one resource unit, a transmission UE calculates metrics for respective resource units in a resource pool and then may 1) select a resource unit for which a metric is maximized, 2) randomly select one of resource units for which metrics are above a predetermined level (e.g., top x % or more), or 3) select a final resource unit according to a corresponding probability after allocating selection probabilities proportional to the metrics to respective resource units.

In some cases, one D2D transmission UE needs to use a plurality of resource units. For example, if the UE should transmit a large amount of data, the UE may operate to use the plurality of resource units. The plural resource units used by the UE may be a plurality of frequency regions in the same subframe, one frequency region in each subframe over multiple subframes, or a combination form. Characteristically, the UE may maintain a single carrier property by using consecutive frequency regions in one subframe.

Figure 9:
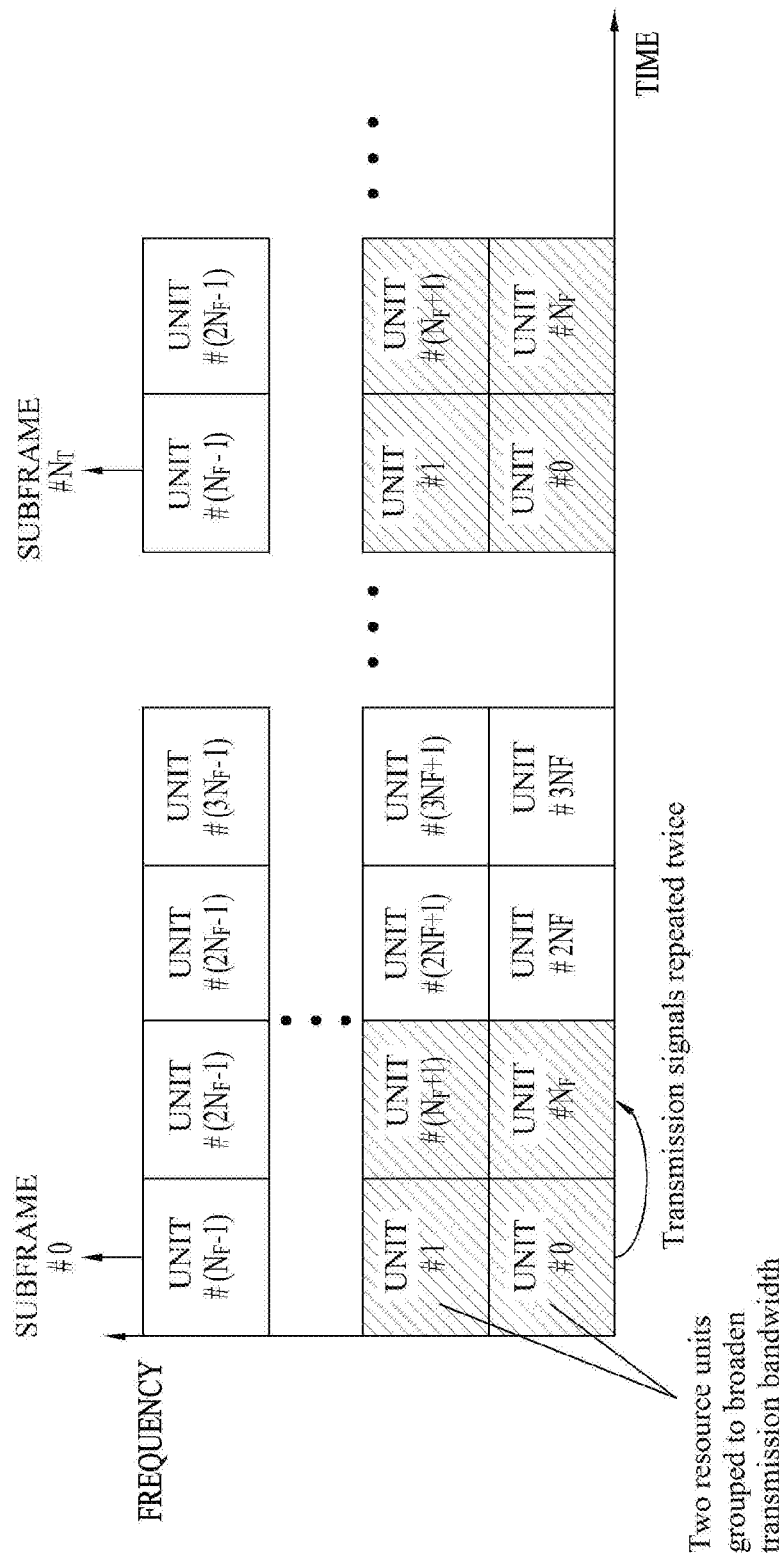
FIG. 9 illustrates an example in which a total of four resource units is used as one bundle by using two consecutive frequency regions in two subframes according to an embodiment of the present invention.

FIG. 9 illustrates an example in which a total of four resource units is used as one bundle by using two consecutive frequency regions in two subframes according to an embodiment of the present invention.

As such, if one UE uses a plurality of resource units, the UE may derive a representative metric for a bundle for aggregating the respective resource units having different metrics as one set (hereinafter, a resource unit bundle) and then select a final resource unit bundle to be used according to one of the above-described methods. In other words, the UE using N resource units defines the N resource units as one resource unit bundle and calculates a representative metric for each resource unit bundle. Such a metric of the resource unit bundle may be determined as a method of A or B described below.

A. A minimum value may be selected from among metrics of resource units constituting the resource unit bundle. Since any one of the resource units constituting the bundle has a low metric, if the bundle has a great effect on an existing UE, this method causes the UE to use the bundle with a low probability. If a metric of a resource unit is derived from a reception energy level, a resource unit having the largest energy level among the resource units constituting the bundle may be regarded as a representative resource unit of the bundle.

B) A mean value of metrics of resource units constituting a resource unit bundle may be selected. In a specific resource unit constituting the bundle, if other resource units are very proper even when the resource units are used by another UE, this method causes the UE to use the bundle with a constant probability. In this case, although an arithmetic mean may be used as the mean value, a geometric mean or a harmonic mean may also be used.

Meanwhile, the concept of a resource unit bundle may be characteristically used only when resource units occupy different frequencies in the same subframe. This is because, while there may be no restriction on a combination of resource units even when a UE simultaneously uses two resource units located in different subframes, there is restriction in that the UE should select adjacent resource units for the above-described reason when two resource units located in the same subframe are simultaneously used.

In selecting a resource unit or a resource unit bundle according to the above-described scheme, a resource unit having a very low metric may always not be selected. That is, if the metric of a specific resource unit or a resource unit bundle is less than a predetermined level, the UE does not select a corresponding resource unit in any case. If the metric is determined from an energy level received in each resource unit, the above case may be interpreted as indicating that a resource unit having an energy level of a predetermined level or more is prohibited from being used. Therefore, if metrics are less than a reference value or less in all resource units in a resource pool, the UE should delay transmission and wait until a valid resource unit is generated. Then, occurrence of strong interference can be prevented in all communications as a result that all UEs try to use resource units in a very dense situation of UEs. The reference value of the metrics may be a predetermined value or a proper value that an eNB or other UEs designate and indicate.

Meanwhile, when a UE scans a resource pool and determines a resource unit to be used, it may be impossible to immediately use the resource unit. This is described with reference to a drawing.

Figure 10:
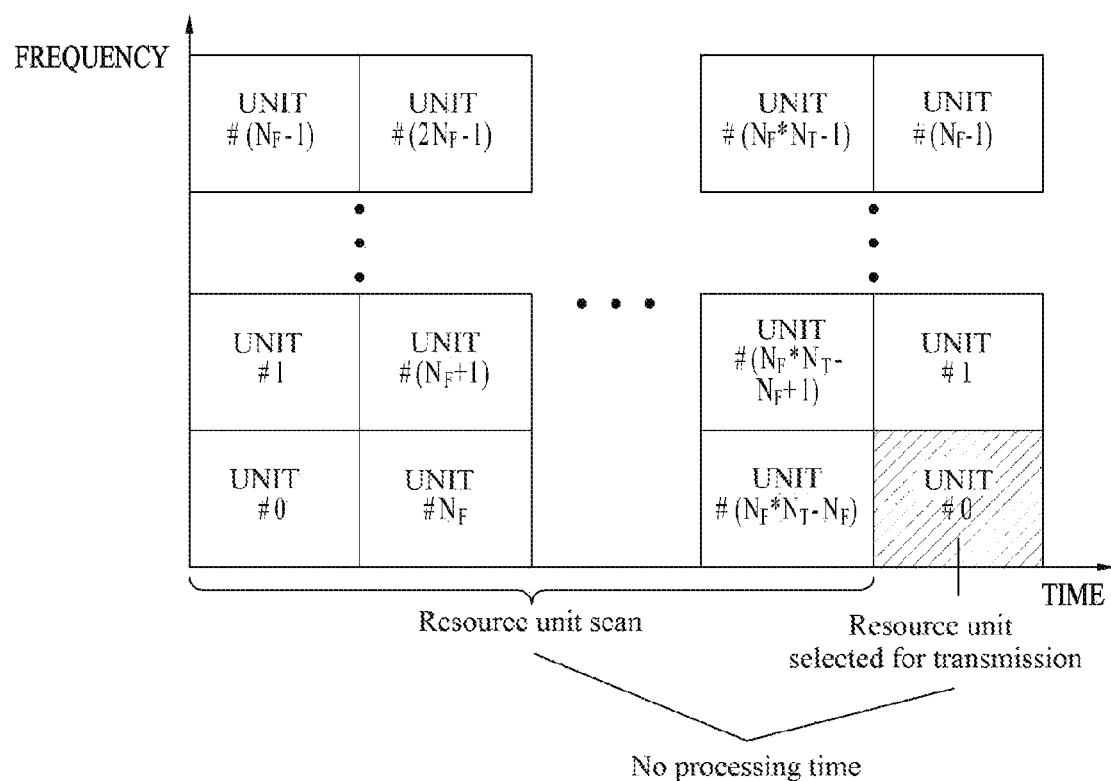
FIG. 10 is a diagram illustrating a scanning procedure of a resource pool and a selection procedure of a resource unit.

FIG. 10 is a diagram illustrating a scanning procedure of a resource pool and a selection procedure of a resource unit. Especially, it is assumed in FIG. 10 that one logical resource unit is mapped to the same subframe.

Referring to FIG. 10, if a UE uses a resource unit located in a first partial subframe among $N_T$ subframes immediately after scanning resource units during previous $N_T$ subframes, a processing time from determination of a resource unit to actual transmission of a D2D signal may not be sufficient. In this case, in order to secure a predetermined processing time, the UE may operate to derive metrics of some resource units located at the rear of $N_T$ subframes belonging to a resource pool of one period according to a scanned result at a previous period.

Figure 11:
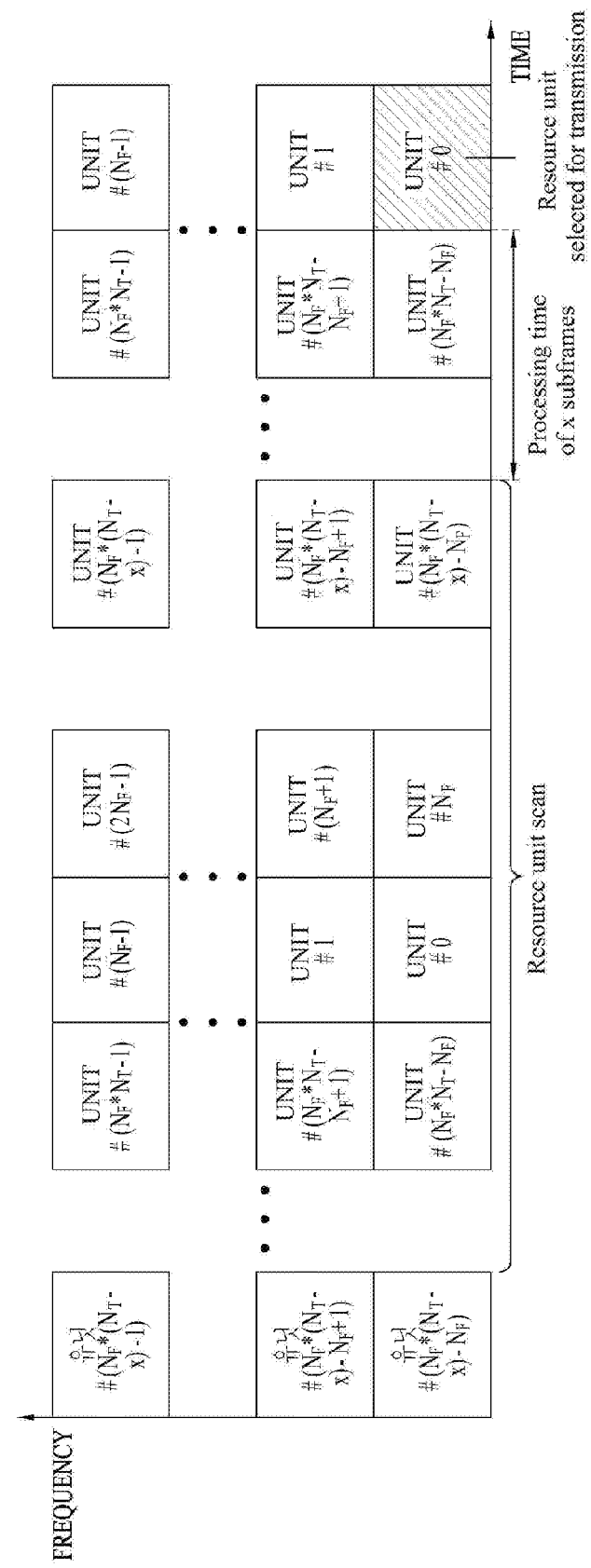
FIG. 11 is a diagram illustrating a scanning procedure of a resource pool and a selection procedure of a resource unit according to an embodiment of the present invention.

FIG. 11 is a diagram illustrating a scanning procedure of a resource pool and a selection procedure of a resource unit according to an embodiment of the present invention. Particularly, FIG. 11 illustrates an example of using resource units located at different periods in one scan operation.

Referring to FIG. 11, in a resource structure on the time domain configured from subframe #0 to subframe #($N_T$−1), a UE does not directly perform scan for the last x subframes and operates to perform scan in a place corresponding to the same logical resource unit located prior to subframe #0 and assume that the scan result is maintained in the last x subframes. Then, even when the UE selects a resource unit appearing first in a specific period, a processing time corresponding to a minimum of x subframes is guaranteed. Herein, x may be determined as 3 subframes for determining a relationship between LTE scheduling and UE transmission.

In other words, a scan result prior to one scan period (or one resource period) is applied to resource units located in subframes within a predetermined processing time starting from the last resource unit in which scan is performed to select a resource unit and a scan result of a corresponding scan period is applied to resource units after the processing time.

Meanwhile, the structure in which a processing time is present between resource unit scan and resource unit selection described in FIG. 11 may be effectively used even when the UE receives a D2D signal. Hereinafter, such an operation will be described in detail.

A D2D reception UE may perform a series of scan operations before starting to receive a D2D data channel from a D2D transmission UE in order to discern which resource unit is used and which parameter (e.g., a modulation and coding scheme (MCS) used for a data channel) is applied by each D2D transmission UE. For this purpose, the D2D transmission UE may transmit resource unit information and parameters used thereby by applying partial D2D resource units and the D2D reception UE scans such resource units and discerns related information.

A signal carrying a resource unit and a parameter that the D2D transmission UE uses in a data channel may be referred to as scheduling assignment (SA). To reduce overhead caused by SA, only a part of all D2D subframes may be used as a resource unit for SA. The D2D reception UE selectively performs a reception operation only in a data resource unit that the UE needs to receive, after scanning resource units that SA can transmit and discerning a resource unit in which the data channel is transmitted and an applied parameter. Even in this case, a time during which the D2D reception UE scans SA and a processing time consumed to select a data resource unit necessary for reception are needed.

Figure 12:
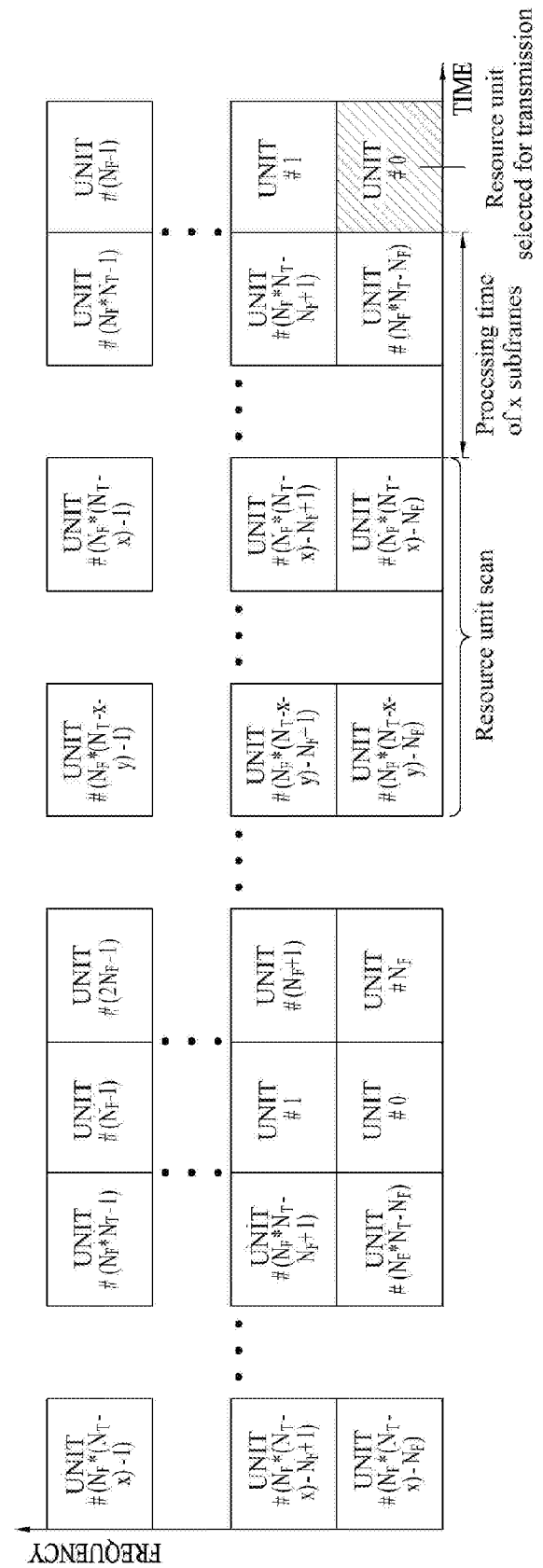
FIG. 12 illustrates an example of deploying an SA resource unit and a data resource unit according to an embodiment of the present invention.

FIG. 12 illustrates an example of deploying an SA resource unit and a data resource unit according to an embodiment of the present invention. Particularly, it is assumed in FIG. 12 that y consecutive subframes are used as an SA resource unit and a scan operation is considered in resource selection after a processing time corresponding to x subframes.

Additionally, the above-described concept may be extended to secure a processing time in terms of a D2D transmission UE, unlike securing of the above-described processing time in terms of a D2D reception UE. Specifically, a UE may require a processing time for determining resources for data transmission thereof by scanning in advance SA transmitted by another UE. For example, a UE may pre-scan SA transmitted by another UE, acquire information about the location of a resource that another UE is to use, define the above-described metric, and then select a resource to be used for transmission thereby. In this case, D2D data that a D2D transmission UE performing transmission after scanning SA of another UE transmits may be assumed as data without SA. The reason is that it is impossible for the transmission UE to transmit SA thereof because the transmission UE performs reception on an SA resource. In this case, the D2D reception UE should be pre-informed that information about data transmission without SA, for example, an MCS, frequency hopping/non-hopping, and the number of RBs used for transmission, is predetermined. Characteristically, since data transmission without SA has an advantage of immediately starting data transmission without an SA transmission procedure immediately after occurrence of data, data transmission without SA is suitable for data transmission that should be performed with a very short time delay.

Meanwhile, a resource unit, especially, a subframe may be separately configured and managed from an SA resource and a data resource. As a result, scan information obtained from a series of SA resources is applied to a series of data resources. Particularly, referring to FIG. 12, scan information obtained from SA resources may be applied to data resources appearing after x subframes corresponding to a processing time from the last subframe among the SA resources.

Figure 13:
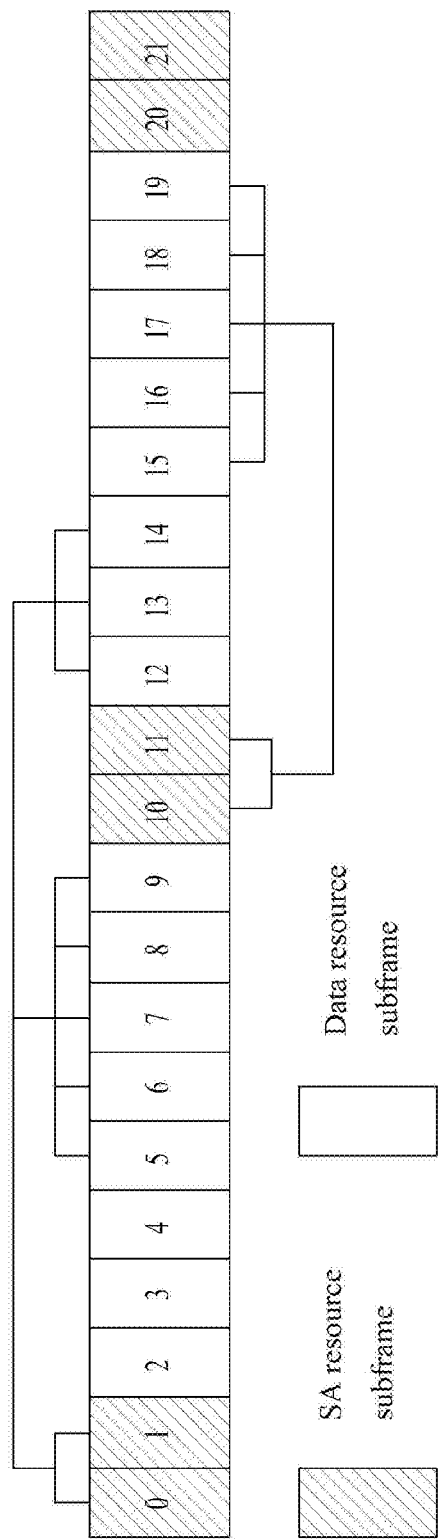
FIG. 13 illustrates an example of separately configuring and managing resources from an SA resource and a data resource according to an embodiment of the present invention.

FIG. 13 illustrates an example of separately configuring and managing resources from an SA resource and a data resource according to an embodiment of the present invention. Particularly, it is assumed in FIG. 13 that two subframes that are consecutive at a period of 10 ms are set to an SA resource set and the other subframes are set to a data resource set. It is also assumed that a processing time of 3 ms is needed between SA scan and data selection and SA can be applied to data starting from a subframe appearing after 4 ms.

Referring to FIG. 13, it can be appreciated that SA in subframe #0 and subframe #1 is applicable to data starting from subframe #5 and SA in subframe #10 and subframe #11 is applicable to data starting from subframe #15. As a result, although subframe #12, subframe #13, and subframe #14 have SA in nearer previous subframes (i.e., subframe #10 and subframe #11), since a processing time is not sufficient, a parameter to be applied is determined by SA of the previous subframes (subframe #0 and subframe #1).

In other words, when consecutive subframes of subframes #n, #(n+1), . . . , #(n+y−1) belong to an SA resource pool within one period, SA transmitted on these SA resources is applied to data resource subframes in subframes #(n+y+x), #(n+y+x+1), . . . , #(n+y+x+A−1), where A denotes a period of an SA resource pool.

Alternatively, in order to maintain one-to-one correspondence between SA resources and data resources, a UE may operate under the assumption that scan information acquired from the SA resources is applied only to the data resources of the same period. If such an operation is applied, the data resources are selected by applying the scan information to resources starting from a data resource after x subframes corresponding to a processing time from the last subframe among the SA resources and the scan information is not applied to resources after the next SA resources. As an example, when resources are configured as illustrated in FIG. 13, a scan result in subframes #0 and #1 is applied only to subframes #5, #6, #7, #8, and #9. In this operation, subframes within a processing time from SA subframes, for example, subframes #2, #3, #4, #12, #13, and #14 in FIG. 13, may be set such that data transmission without SA is not possible therein.

Meanwhile, in the above-described operation, the SA resource subframes may not always be consecutive and may be discontinuously located. If the SA resource subframes are discontinuously located, subframes unused for D2D communication may be located between the SA subframes. If a D2D data resource subframe is present, a parameter for a corresponding data subframe may be determined by an SA resource set of a previous period according to the above-described rule. Alternatively, to prevent a permutation operation of the SA subframe and the data subframe, a D2D data subframe linked with corresponding SA may not be located between two subframes belonging to one SA resource set. In other words, consecutive D2D subframes constitute the SA resource set.

Although it is assumed in FIG. 10 or FIG. 11 that NT subframes corresponding to one period are scanned, the present invention is not limited thereto and a larger number of previous subframes may be scanned for more accurate scan. In this case, different metrics over time may be measured even with respect to the same logical resource unit and the concept used in the above-described resource unit bundle may be introduced so that metrics of individual physical resource units corresponding to the same logical resource unit are measured and a metric of a corresponding logical resource unit may be calculated from the measured metrics.

For example, if a metric is given as a reciprocal of a reception energy level and a minimum number among a plurality of metrics is adopted as a representative metric, a value corresponding to the highest reception energy level as a result of scanning the same resource unit in multiple subframes is selected as a representative metric of a corresponding resource unit. Particularly, an operation of scanning the same resource unit in multiple subframes can prevent collision generated by regarding a corresponding resource as an empty resource even when a UE that has performed communication temporally has no data to transmit and thus low energy is detected in a corresponding resource unit or low energy is received due to a temporally poor channel state.

Figure 14:
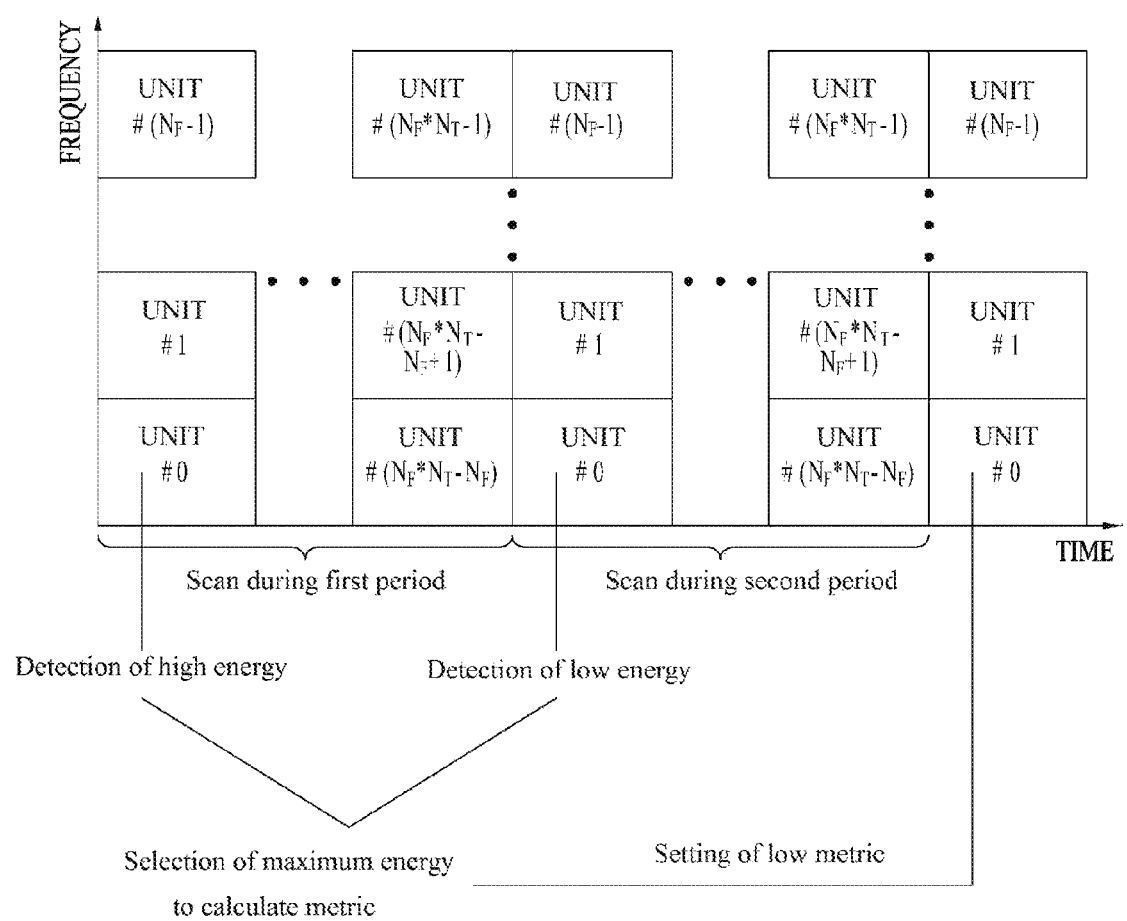
FIG. 14 is a diagram illustrating an operation of scanning the same resource unit in multiple subframes according to an embodiment of the present invention.

FIG. 14 is a diagram illustrating an operation of scanning the same resource unit in multiple subframes according to an embodiment of the present invention.

Referring to FIG. 14, resource pools are scanned during two periods. In resource unit #0, while low energy is detected during one period, high energy is detected during the other period. Therefore, a metric for the corresponding resource unit is set to be low according to the principle of selecting the lowest metric and an operation is performed so as to minimize use of the corresponding resource unit.

As another example, if a mean value of a plurality of measurement values is used as a scheme of calculating a representative metric, a middle metric may be allocated to resource unit #0 in FIG. 14. In this case, although an interference problem may occur when an existing UE temporally stops using resource unit #0, there is an advantage of raising a probability of rapidly using the corresponding resource unit when the existing UE ends communication so that resource unit #0 is not used any longer.

In final system design, a region of a time duration for scanning a resource pool and a method for deriving a metric of each resource unit from a scan result in multiple subframes should be properly selected in consideration of the above advantages and disadvantages.

Hereinafter, in the above-described operation of scanning the resource pools, a detailed method for determining the length of time during which each UE performs a scan operation will be described. For convenience of description, a time duration during which the UE performs a scan operation in order to calculate a metric of each resource unit is referred to as a scan window. In the embodiment of FIG. 11, the length of the scan window is $N_T$ subframes corresponding to the period of a resource pool and an offset corresponding to x subframes is applied for a processing time. In the embodiment of FIG. 14, the scan window has a length of $2*N_T$ subframes without an offset.

Although the length of the above-described scan window may be fixed for convenience of operation, the length of the scan window may be adjusted according to a rule in order to adapt to a dynamically changing situation. For example, the length of the scan window may be adjusted according to the length of time during which a transmission UE stops transmitting a D2D signal.

Generally, a D2D UE cannot receive another signal at a timing during which a signal thereof is transmitted because the signal transmitted thereby functions as powerful interference with respect to the reception signal. In other words, if a specific D2D transmission UE selects a specific resource unit and transmits a D2D signal, this means that scan for a resource unit located in the same subframe as the specific resource unit is impossible. Therefore, in order to scan each resource unit at the same period, the scan window may be set only at a timing during which the D2D UE does not transmit the D2D signal.

Generally, traffic which occurs with respect to an individual UE has a random characteristic over time in which, for example, a large amount of traffic occurs at a specific timing and no traffic occurs at another timing. Therefore, although a specific UE selects a specific resource unit repeated at a period of NT subframes and transmits a D2D signal in the specific resource unit, the case in which the UE does not transmit a signal because there is no transmission traffic at a specific timing occurs. For convenience of description, if the UE transmits the D2D signal at a period of a specific resource pool, this may be referred to as an ON state of the UE and, if the UE does not transmit the D2D signal at a period of a specific resource pool, this may be referred to as an OFF state of the UE. In this case, due to the above-described random characteristic of traffic, the specific UE transmits the D2D signal passing through an ON state and on OFF state. In this case, the scan window of the specific UE appears only when the UE is in the OFF state and, for more accurate scan, the length of the scan window may be adjusted according to the length of time during which the UE remains in the OFF state.

More specifically, the length of the scan window may be set to one of 0 and a specific number A greater than 0. If the length of the scan window is set to A, this means that the scan window has a length corresponding to A times a resource pool period, i.e., $A*N_T$ subframes.

In addition, the length of the scan window of 0 or A may be selected based on whether the length of time during which the UE remains in the OFF state is greater than a specific reference value so that the length of the scan window can be A. For example, assuming that a processing time according to scan is not needed, the reference value may be a period of A and, if a constant processing time is needed as in FIG. 11, the reference value may be a period of (A+1). Generally, due to channel variation and presence of noise components, accuracy of a resource scan result is affected by the length of the scan window. In addition, to obtain a scan result having sufficient accuracy, a scan window of a minimum predetermined length is needed and, in the case, A may be a value corresponding to the minimum predetermined length of the scan window.

Accordingly, if a specific UE has a sufficient time to remain in an OFF state and then the scan window having a length of A can be set, the UE may perform resource scan and select a resource unit to be used in the next ON state according to the above-described principle. Meanwhile, if the UE cannot set the scan window of a length of A because a time during which the UE remains in the OFF state is insufficient, stable scan is impossible in a corresponding duration. Therefore, the scan window is not set, i.e., the length of the scan window is set to 0 and new scan is not performed. In this case, a resource to be used in the next ON state may be determined by maintaining an existing stable scan result. In other words, an existing resource may be maintained.

Alternatively, if a time during which the UE remains in an OFF state is not sufficient even when new D2D traffic occurs while the UE is in the OFF state and thus the UE should transition to an ON state, the OFF state may be additionally maintained during a partial time so as to set the scan window of the length A and the D2D signal may be transmitted using a newly determined resource unit. Especially, in the case in which a time during which the UE remains in the OFF state does not reach a reference value but approximates to the reference value, for example, a time necessary to reach the reference value is less than a predetermined level, such an operation may be selectively performed in a situation in which the scan window of the length A can be set only with slight addition of the OFF state The above-described operation may be generalized as follows. The length of the scan window is maintained or increases as a time during which the UE remains in the OFF state increases. However, if the length of the scan window excessively increases, since a scan result performed a long time ago affects selection of a resource unit, a predetermined restriction may be applied to the maximum length of the scan window in order to exclude the above case.

As another example of setting the scan window, if a predetermined criterion is satisfied, an ON state may forcibly transition to an OFF state so as to perform resource scan. More specifically, if the UE has consecutively remained in the ON state during a period of M, the UE may operate to perform resource scan by transitioning to the OFF state during at least a predetermined time. If a minimum length of the resource scan window is present, when the UE determines a criterion that the UE consecutively remains in the ON state, the UE that remains in the OFF state during a time when the scan window of a minimum length cannot be set may be regarded as still remaining in the ON state. This is because the fundamental reason of performing the above operation is to prevent a specific UE from losing an opportunity of scanning a communication environment while the UE remains in the ON state for an excessively long time and continuing to use an improper resource.

Figure 15:
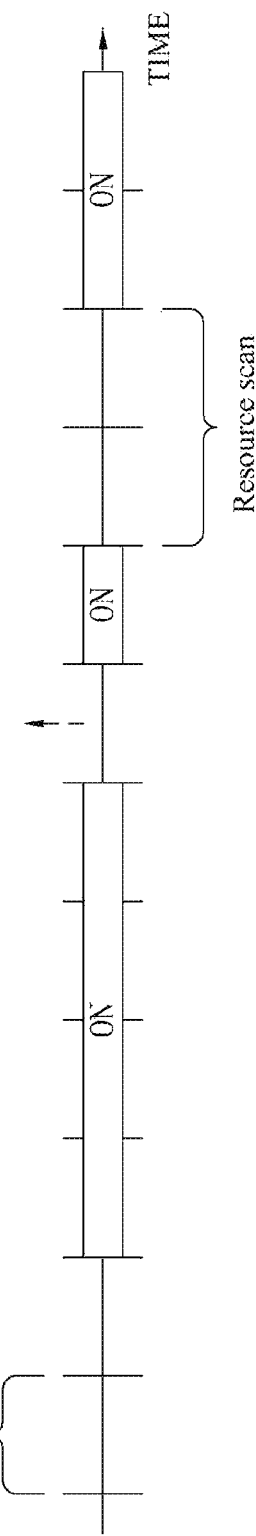
FIG. 15 illustrates an example of configuring a scan window according to an embodiment of the present invention.

FIG. 15 illustrates an example of configuring a scan window according to an embodiment of the present invention. Particularly, it is assumed in FIG. 15 that a period of M is 6 and resource scan can be performed only when an OFF state of at least two periods should be present.

Referring to FIG. 15, after the UE is in an ON state during four periods, the UE is in an OFF state during one period. However, the UE transitions to the ON state again in the next period and, as a result, a scan window cannot be formed in an intermediate OFF state. Accordingly, it is assumed that ON states of 6 periods are consecutively present and the UE transitions to the OFF state during the next two periods to perform resource scan.

In performing the operation described in FIG. 15, the UE may operate so as to set a scan window by previously transitioning to the OFF state before consecutive ON states during a period of M occur. Especially, the UE operates so as to set a minimum scan window by probabilistically transitioning to the OFF state from the ON state. Then, a specific UE alternately transitions between the OFF state and ON state in a periodic form, thereby preventing a phenomenon of generating an error during resource scan of another UE. Such an operation may be set such that "a time during which a specific UE can consecutively remain in an ON state after consecutively remaining in an OFF state once for a predetermined time is less than or equal to the period of M".

Figure 16:
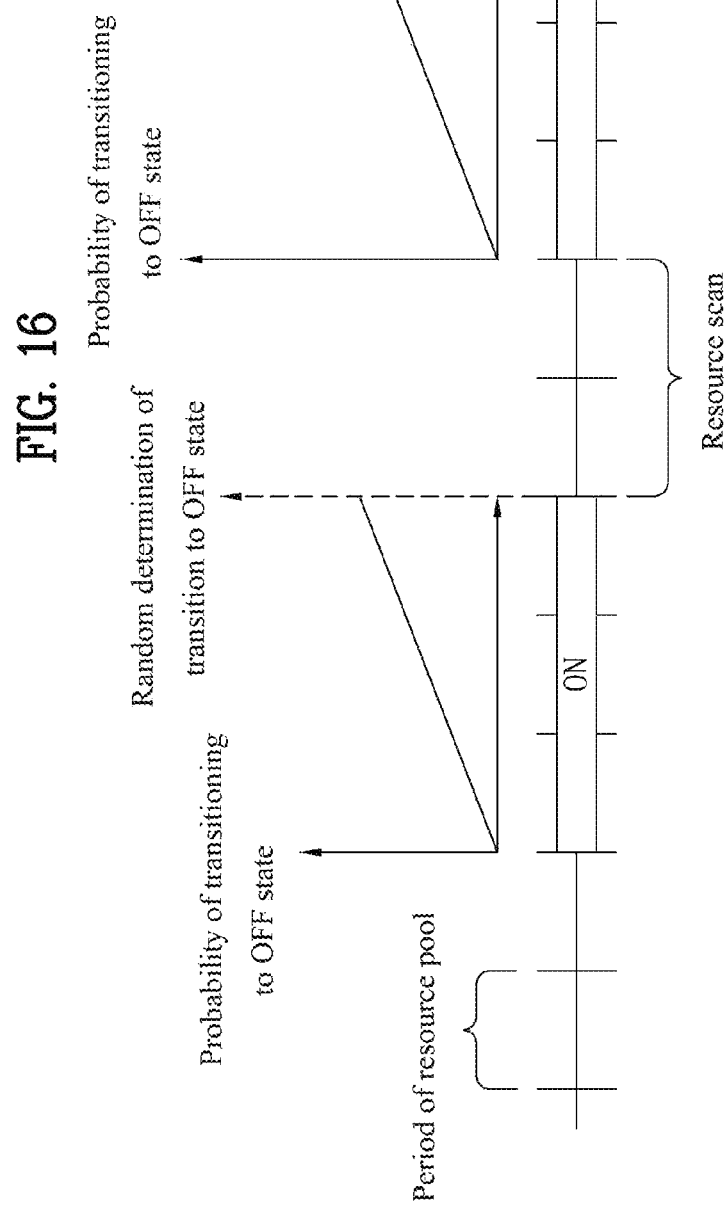
FIG. 16 illustrates an example of configuring an ON state and an OFF state according to an embodiment of the present invention.

FIG. 16 illustrates an example of configuring an ON state and an OFF state according to an embodiment of the present invention.

Referring to FIG. 16, a D2D UE may operate to perform resource scan prior to occurrence of consecutive ON states during a period of M while increasing a probability of transitioning to an OFF state as a time during which the D2D UE consecutively remains in an ON state increases. In this case, it is possible to set a probability of transitioning to the OFF state to 1 when consecutive ON states occur during the period of M.

As another example of performing resource scan by forcibly transitioning to the OFF state even if the UE is in the ON state when a predetermined condition is satisfied, the UE may be set to start to perform a scan operation and a resource unit selection operation by transitioning to the OFF state if situation change of a predetermined level or more is detected while performing an additional scan operation in a non-transmission subframe.

As described above, a transmission UE can perform a scan operation in a subframe in which the UE does not transmit a D2D signal. Accordingly, while the UE performs continuous scan (this is referred to as additional scan) in the subframe in which the D2D signal is not transmitted, if variation of a predetermined level or more is detected in a scan result, the UE may regard this variation as meaningful variation of a communication situation. In this case, the meaningful variation may include location movement of a UE, transmission participation of a new UE, or transmission stop of an existing UE.

Since such meaningful variation desirably considers variation of a long time unit, it is desirable that the length of an additional scan window be longer than the length of a scan window for selecting a resource unit. In this case, a value measured through additional scan may be an energy level in each resource unit or reception power of a specific signal such as a DM-RS in each resource unit and a variation criterion for such a measurement value may apply i) to iv) described below.

i) If a measurement value in a specific resource unit increases or decreases by x % or more, this may be judged that variation is detected in the corresponding resource unit. In other words, if variation of y % or more is detected among all measured resource units, this may be regarded as variation of a communication environment and the UE may operate to transition to an OFF state.

ii) Alternatively, a representative value of all measured resource units, for example, a maximum value, a minimum value, or a mean value of measurement values in respective resource units is defined and, if the representative value increases or decreases by x % or more, this may be regarded as variation of a communication environment and the UE may operate to transition to the OFF state.

iii) Alternatively, the UE may store a metric upon selecting a resource unit which is being used and, if the number of resource units having a larger metric than the stored metric is more than a predetermined number, this may be regarded as variation of a communication environment and the UE may operate to transition to the OFF state.

iv) Lastly, the UE may store a metric upon selecting a resource unit which is being used and, if a resource unit having a larger metric than the stored metric by x % or more is found, this may be regarded as variation of a communication environment and the UE may operate to transition to the OFF state.

As another example of performing resource scan by forcibly transitioning to the OFF state even if the UE is in the ON state when a predetermined condition is satisfied, the UE may transition to the OFF state and perform resource scan when a synchronous criterion of the UE is changed.

Specifically, although a D2D transmission UE detects a synchronous reference signal transmitted by an eNB or another UE, establishes time and/or frequency synchronization in the synchronous reference signal, and then transmits a D2D signal, synchronization reference of a specific transmission UE may be changed to that of another eNB or another UE due to movement of the specific UE. Alternatively, when the UE transmits the synchronous reference signal, continuous transmission of the reference signal of the UE is ended and another UE may transmit the synchronous reference signal. In this way, if synchronous reference is changed, the D2D transmission UE may regard this as variation of a communication environment, transition to an OFF state (i.e., temporarily stop transmitting a D2D signal), perform resource scan, and reselect a resource unit to be used thereby.

Characteristically, a time during which a UE remains in the OFF state, in other words, a time at which the UE starts transmitting the D2D signal according to new synchronous reference by transitioning to an ON state after resource scan, may be randomly determined. This operation is performed to prevent selected resource units from colliding by causing all UEs to simultaneously start transmitting signals at the same timing. For example, when synchronous reference is changed, each UE may perform resource scan while remaining in the OFF state during a minimum predetermined duration and randomly determine a time duration during which the UE remains in the OFF state so that UEs sequentially transmit D2D signals. In addition, UEs that remain in the OFF state for a longer time may first detect a signal of a UE transitioning to the ON state and select a resource unit thereof based on the detected signal.

Hereinafter, a reference for determining whether each resource unit is being occupied by an existing UE, through resource scan, will be described in detail. As described above, a UE may determine whether each resource unit is being occupied by an existing UE upon performing resource scan.

For example, in calculating a metric from an energy level in each resource unit, if energy of a predetermined level or more is detected, it is determined that a corresponding resource unit is being used by an existing UE and a low metric (e.g., 0) is assigned. If energy of a predetermined level or less is detected, it is determined that a corresponding resource unit is empty and a high metric (e.g., 1) is assigned. Through such a procedure, it is determined which resource unit is empty and, if a UE transitions to an ON state, the UE may operate to use the resource unit determined to be empty.

Alternatively, a random backoff procedure may be considered. Specifically, a UE generates a random number within a predetermined range and initializes a backoff count. Next, the UE decreases as many backoff counts as the number of empty resource units in each subframe. If the backoff count reaches 0 or less, the UE may operate to transmit a D2D signal. Even in this case, it is necessary to determine whether each resource unit is being used by another UE.

Generally, whether a resource unit is empty may be determined by judging whether energy (or reception power of a specific signal such as a DM-RS) detected in a corresponding resource exceeds a predetermined reference value. However, in normal OFDM based transmission, although a UE transmits a signal using only a specific resource unit, power transmission caused by a transmission signal appears in other frequency regions (i.e., other resource units). This is referred to as in-band emission.

By in-band emission, although signal transmission is performed only in a specific resource unit of a specific subframe, signal power of a predetermined level may be detected in the other resource units. This phenomenon may be used as one method considered in determining whether each resource unit is empty. Specifically, a reference value used to determine whether a resource unit is empty may be adjusted according to a power value of each resource unit detected in the same subframe.

That is, if a high power is detected in a specific resource unit of a specific subframe and the fact that the corresponding resource unit is used by another UE is surely recognized, the reference value used to determine whether another resource unit of the same subframe is empty is set to be high relative to the reference value used in other subframes. Therefore, even when a resource unit is actually empty, that is, the resource unit is unused, but power of a predetermined level appears by in-band emission of transmission in another resource unit, the corresponding resource unit may be determined to be empty.

More specifically, the reference value used to determine whether each resource unit is empty in each subframe may be determined by maximum reception energy detected in a resource unit of the same subframe. For example, assuming that maximum reception energy detected in a resource unit of subframe #n is $E_n(W)$, the reference value for determining whether each resource unit in subframe #n is unused may be max $(a*E_n, b)$ (W), where a is a coefficient for setting the reference value in proportion to $E_n$ and b is a minimum value of the reference value for determining whether a resource unit is unused. Through this procedure, whether each resource unit is empty can be more accurately determined even in a situation in which in-band emission is present.

Figure 17:
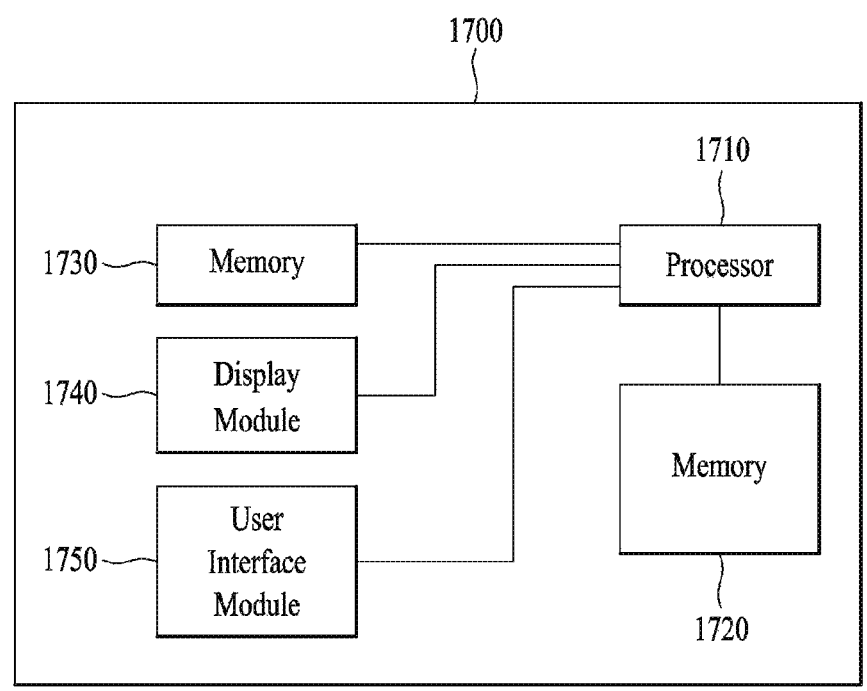
FIG. 17 is a block diagram of a communication apparatus according to an embodiment of the present invention.

FIG. 17 is a block diagram illustrating a communication device according to embodiments of the present invention.

In FIG. 17, the communication device 1700 includes a processor 1710, a memory 1720, a Radio Frequency (RF) module 1730, a display module 1740, and a user interface (UI) module 1750.

The communication device 1700 is disclosed for illustrative purposes only and certain modules may also be omitted from the communication device 1700 as necessary. In addition, the communication device 1700 may further include necessary modules. Some modules of the communication device 1700 may be identified as more detailed modules. The processor 1710 is configured to carry out the operations of the embodiments of the present invention. For detailed operations of the processor 1710 reference may be made to FIGS. 1 to 16.

The memory 1720 is connected to the processor 1710, and stores an operating system, applications, program code, data and the like. The RF module 1730 is connected to the processor 1710 and converts a baseband signal into a radio frequency (RF) signal, or converts the RF signal into the baseband signal. For these operations, the RF module 1730 performs analog conversion, amplification, filtering, and frequency up-conversion in order or performs such operations in reverse order. The display module 1740 is connected to the processor 1710 and displays a variety of information. The scope or spirit of the display module 1740 of the present invention is not limited thereto, and the display module 1740 may be any of well-known elements, for example, a Liquid Crystal Display (LCD), a Light Emitting Diode (LED), an Organic Light Emitting Diode (OLED) and the like. The user interface (UI) module 1750 is connected to the processor 1710, and may be implemented as a combination of user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

While the above-described resource scan method for D2D communication in a wireless communication system and the apparatus therefor have been described based on an example applied to a 3GPP LTE system, the present invention is also applicable to various wireless communication systems in addition to the 3GPP LTE system.

What is claimed is:

1. A method for transmitting a device-to-device (D2D) signal by a user equipment (UE) in a wireless communication system, the method comprising:
monitoring a plurality of first subframes located before a subframe n;
determining at least one second subframe based on received signal strength indication (RSSI) measured in the plurality of first subframes, wherein the at least one second subframe is located after a subframe n+x and x is integer number; and
transmitting the D2D signal using the at least second subframe.

2. The method according to claim 1, wherein x is less than or equal to 4 and positive integer.

3. The method according to claim 1, wherein a subframe having a reference signal received power (RSRP) not satisfied a threshold value is not determined as the at least one second subframe.

4. The method according to claim 1, wherein the plurality of first subframe is consecutive on a time axis.

5. The method according to claim 1,
wherein if a number of the at least one second subframe is smaller than a specific value, the RSSI is repeatedly measured until the number of the at least one second subframe becomes greater than or equal to the specific value.

6. A user equipment (UE) for transmitting device-to-device (D2D) signal in a wireless communication system, the UE comprising:
a wireless communication module for transmitting and receiving a signal to and from a base station (BS) or a peer UE; and
a processor for processing the signal,
wherein the processor is configured to:
monitor a plurality of first subframes located before a subframe n,
determine at least one second subframe based on received signal strength indication (RSSI) measured in the plurality of first subframes, wherein the at least one second subframe is located after a subframe n+x and x is integer number; and
transmit the D2D signal using the at least second subframe.

7. The UE according to claim 6, wherein x is less than or equal to 4 and positive integer.

8. The UE according to claim 6, wherein a subframe having a reference signal received power (RSRP) not satisfied a threshold value is not determined as the at least one second subframe.

9. The UE according to claim 6, wherein the plurality of first subframe is consecutive on a time axis.

10. The UE according to claim 6, wherein if a number of the at least one second subframe is smaller than a specific value, the RSSI is repeatedly measured until the number of the at least one second subframe becomes greater than or equal to the specific value.

* * * * *